United States Patent [19]
Drori

[11] Patent Number: 5,964,554
[45] Date of Patent: Oct. 12, 1999

[54] DUPLICATING KEY MACHINE AND METHOD OF OPERATING SAME

[75] Inventor: Mordeki Drori, 6400 Center St., Suite A#201, Mentor, Ohio 44060

[73] Assignee: Mordeki Drori, Mentor, Ohio

[21] Appl. No.: 08/988,255

[22] Filed: Dec. 10, 1997

Related U.S. Application Data

[63] Continuation of application No. 08/609,859, Mar. 1, 1996, abandoned, which is a continuation of application No. 08/186,982, Jan. 27, 1994, Pat. No. 5,496,138.

[51] Int. Cl.[6] .................................................. B23C 3/35
[52] U.S. Cl. ............................ 409/132; 76/110; 409/81
[58] Field of Search ............................... 409/81, 82, 83, 409/132; 76/110

[56] References Cited

U.S. PATENT DOCUMENTS

| | | |
|---|---|---|
| 1,390,958 | 9/1921 | Hulbert . |
| 1,656,295 | 1/1928 | Schechter .................................. 409/81 |
| 1,752,668 | 4/1930 | Johnson .................................... 409/81 |
| 1,848,046 | 3/1932 | Caron . |
| 2,098,728 | 11/1937 | McPhee .................................... 409/81 |
| 2,148,668 | 2/1939 | Yoskowitz et al. . |
| 3,094,039 | 6/1963 | Spain ........................................ 409/82 |
| 3,257,908 | 6/1966 | Haggstrom . |
| 3,286,596 | 11/1966 | Lieptz . |
| 3,418,882 | 12/1968 | Brand . |
| 3,430,535 | 3/1969 | Haggstrom . |
| 3,675,536 | 7/1972 | Hungerford, Jr. et al. . |
| 3,865,011 | 2/1975 | Patriquin . |
| 3,902,382 | 9/1975 | Lieptz . |
| 4,023,464 | 5/1977 | Zion . |
| 4,526,498 | 7/1985 | Fieldhouse . |
| 4,592,683 | 6/1986 | Wu . |
| 4,657,448 | 4/1987 | Alexander . |
| 4,898,504 | 2/1990 | Agius et al. .............................. 409/81 |
| 5,271,698 | 12/1993 | Heredia et al. . |
| 5,314,274 | 5/1994 | Heredia et al. . |
| 5,443,339 | 8/1995 | Heredia et al. . |
| 5,496,138 | 3/1996 | Drori ........................................ 409/81 |
| 5,538,374 | 7/1996 | Cole et al. ............................... 409/83 |
| 5,556,240 | 9/1996 | Almblad . |
| 5,660,509 | 8/1997 | Cole et al. ............................... 409/81 |
| 5,676,504 | 10/1997 | Mueller et al. .......................... 409/81 |

FOREIGN PATENT DOCUMENTS

1414033 9/1965 France .

*Primary Examiner*—Daniel W. Howell
*Attorney, Agent, or Firm*—Renner, Otto, Boisselle & Sklar

[57] ABSTRACT

A key duplicating machine and the method of operating the machine wherein one or more key cutters move linearly along an axis perpendicular to the rotation of the key cutters. The linear movement enables the cutters to precisely cut a single sided or double sided key blank to a profile corresponding to the key to be duplicated. In addition, the key to be duplicated and the key blank are clamped together in a single operation in one clamping unit with one clamping force.

2 Claims, 10 Drawing Sheets

DUPLICATING KEY MACHINE AND METHOD OF OPERATING SAME

This is a continuation of U.S. application Ser. No. 08/609,859, now abandoned, which in turn is a continuation of Ser. No. 08/186,982 filed Jan. 27, 1994, now U.S. Pat. No. 5,496,138 entitled KEY DUPLICATING MACHINE AND METHOD OF OPERATING SAME to the same applicant.

FIELD OF THE INVENTION

The present invention relates to a machine for duplicating keys and the method of operating the machine. More particularly, the invention relates to a duplicating key machine and the method of operating the machine wherein one or more key cutters move linearly along an axis perpendicular to the rotation of the key cutters. The linear movement enables the cutters to penetrate and precisely cut a single sided or double sided key blank to a profile corresponding to the key to be duplicated. In addition the key to be duplicated and the key blank are clamped together in one clamping unit with one clamping force in a single operation.

BACKGROUND OF THE INVENTION

Various types of duplicating key machines are known in the prior art. With the most common type of duplicating machines, both the key blank and the key to be duplicated are rigidly secured to the same shaft which rotates about its longitudinal axis to move the blank key against the cutting wheel during the cutting operation. Moreover, in the prior art designs, the key blank and the key to be duplicated are clamped to separate clamping units, each operated by a different clamp mechanism and tighten by separate handles so that each key is clamped by a different compressive force. The design of these prior art machines results in machines which are quite expensive to produce and maintain. Also, because of the inefficient and unreliable machine performance of the prior art designs, a high percentage of unusable keys are produced.

OBJECTS AND SUMMARY OF THE INVENTION

It is an object of the present invention to provide a duplicating key machine and method of operating the machine which obviates the problems and limitations of the prior art systems.

It is a further object of the present invention to provide an improved duplicating key machine and method of operating the machine wherein the key cutters move both in a linear, parallel direction and rotationally with respect to a longitudinal axis through the key cutters.

Yet another object is to provide an improved duplicating key machine and method of operating the machine wherein the key guides which engage the grooves in the key to be duplicated and move the cutters to cut an identical groove in the key blank reciprocate in a linear, parallel direction with respect to the longitudinal axis about which the cutters rotate.

Still another object of the present invention is to provide a duplicating key machine and method of operating the machine which cuts both double sided and/or single sided key blanks.

The present invention discloses an improved duplicating key machine which includes a number of innovative features. One or more cutting wheels are mounted to both rotate about and move linearly with respect to a single axis through the cutting wheels.

According to a further preferred feature of the invention, the key to be duplicated and the key blank are clamped by the same clamping unit which is connected to a support that moves perpendicular to the axis about which the cutters are rotating.

A further preferred feature to the invention is that the key to be duplicated and the key blank are clamped substantially perpendicular to the axis about which the cutters rotate. Further, the key to be duplicated and the key blank are clamped with a single clamping unit in a joint tightening operation. The vector of the compressive force of the clamping unit is directed through both keys to be duplicated and the key blank for effective use of the compressive force. Further, the key blank and the key to be duplicated are moved into and out of engagement with the cutting unit by a single guiding mechanism in the clamping unit and single guiding operation. This feature is important for the accuracy of such guidance. The clamping unit also includes a key alignment guide which ensures that the key blank and the key to be duplicated are in proper alignment during the clamping operation. This alignment guide is disengaged when the clamping unit moves towards the cutting unit.

According to the invention, one embodiment of the key duplicating machine comprises a support to which a clamping unit for clamping one sided keys and a clamping unit for clamping two sided keys are mounted. This feature enables the same machine to be used for cutting both one sided and two sided keys by different clamping units.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
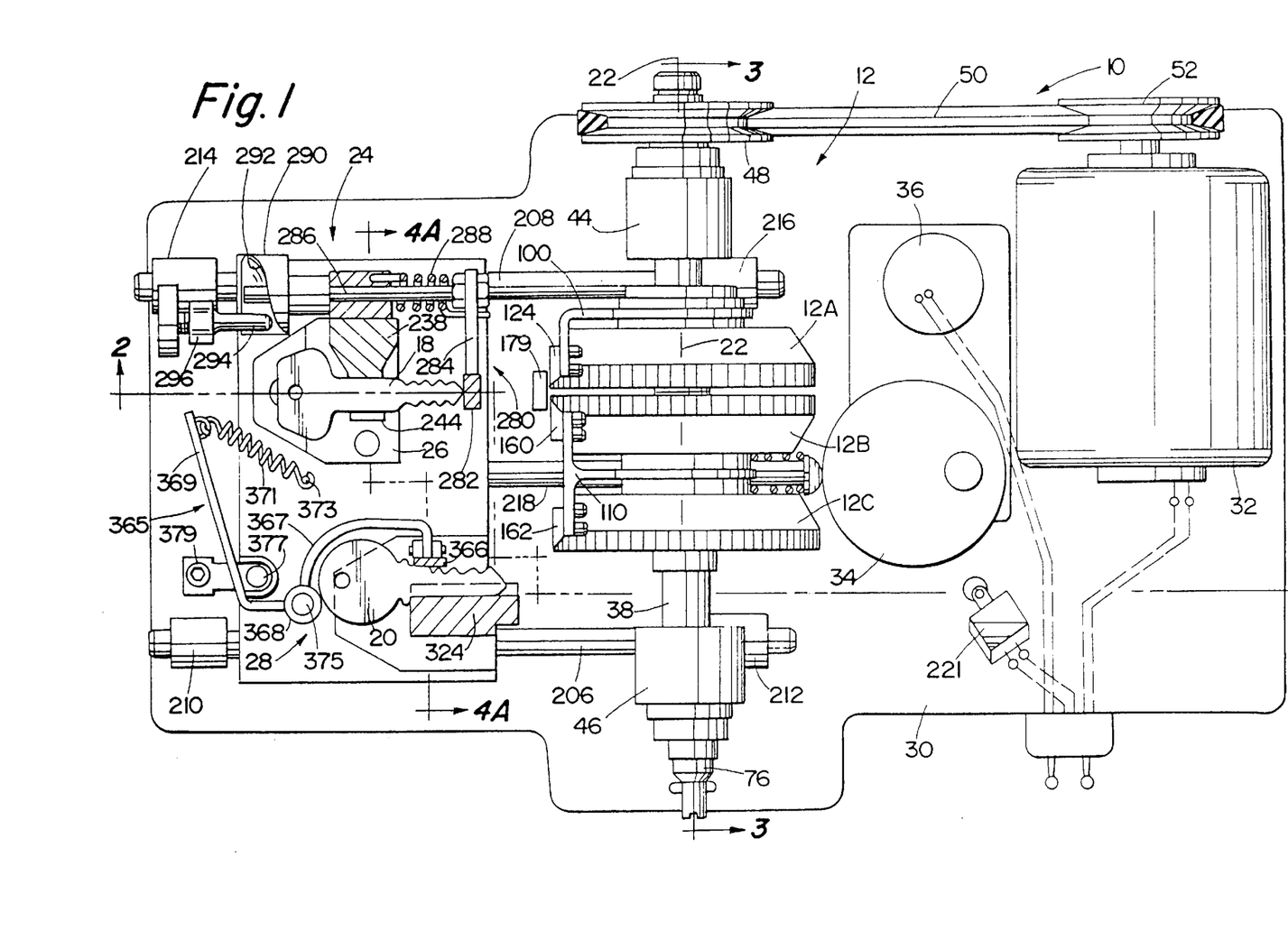
FIG. 1 is a plan view of a key duplicating machine, partly in cross-section, in accordance with the preferred embodiment of the present invention.
Figure 2:
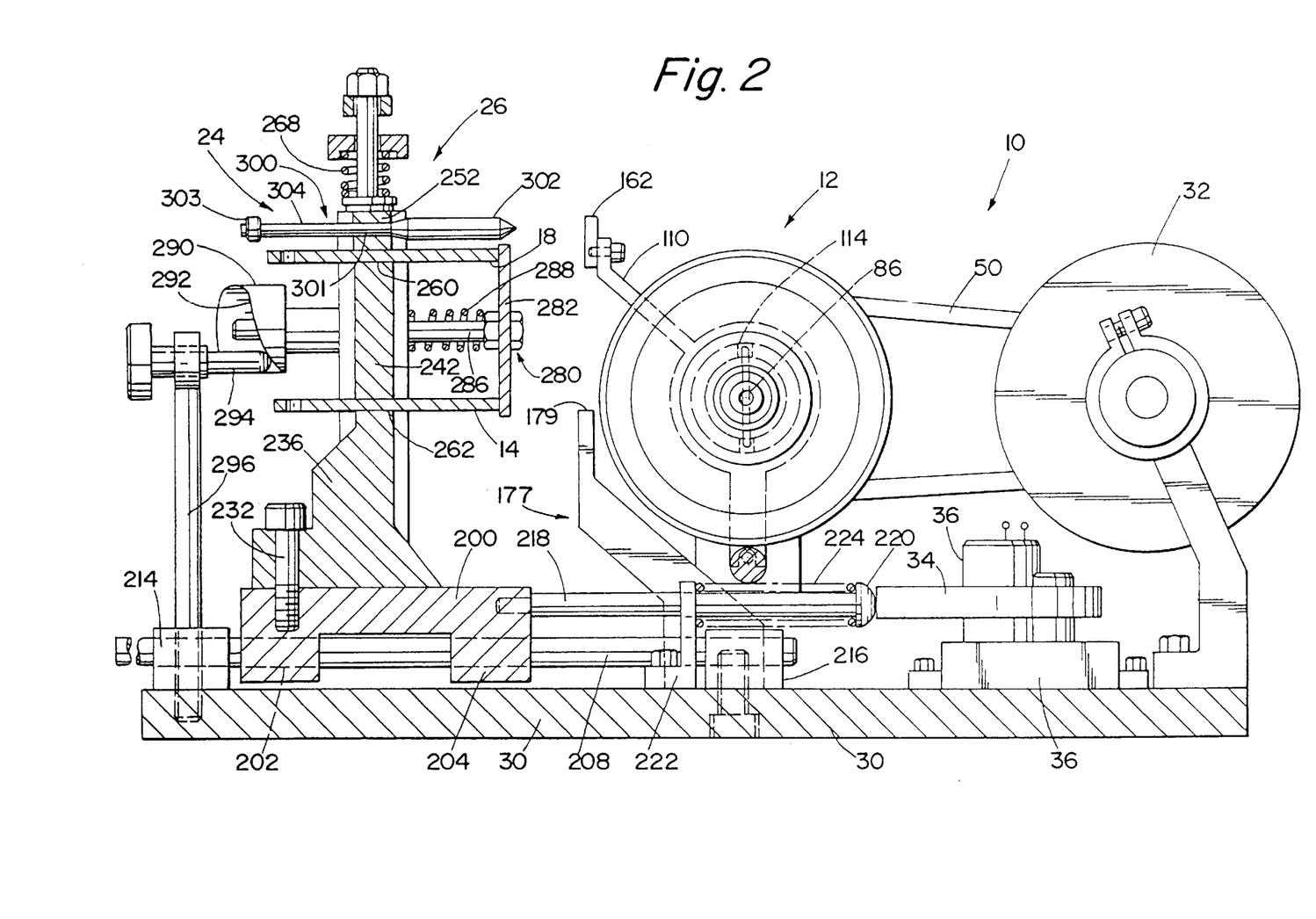
FIG. 2 is a side view taken through line 2—2 of FIG. 1, partly in cross-section, illustrating the relationship of the key clamping unit with respect to the cutting unit.
Figure 3:
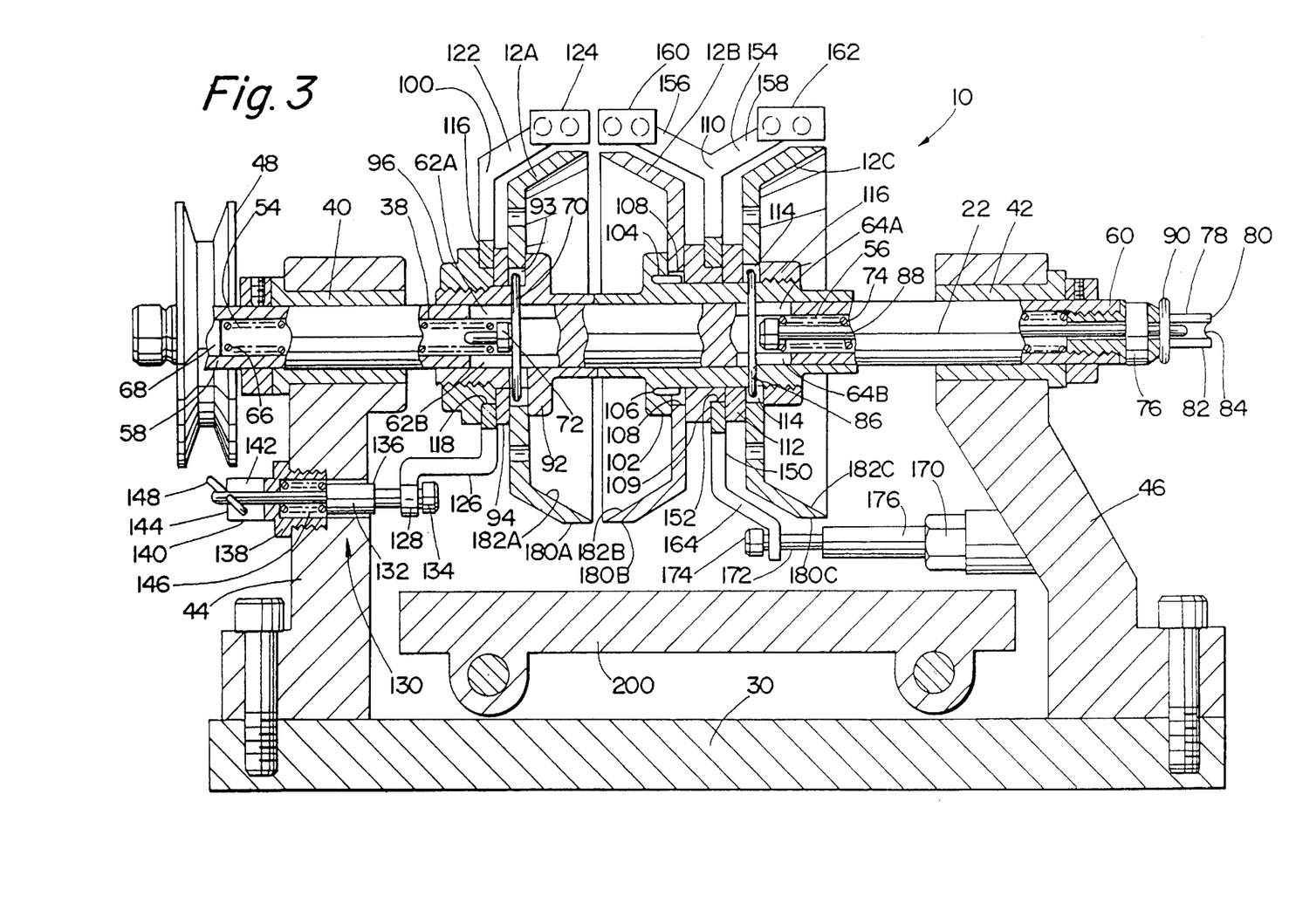
FIG. 3 is a side cross-sectional view taken through line 3—3 of FIG. 1, illustrating the cutting unit.

Referring to FIGS. 1, 2, and 3, a key duplicating machine 10 is shown incorporating the following novel features. A cutting unit 12 incorporates one or more cup shaped milling cutters 12A, 12B, and 12C (also called cutting wheels), for cutting double and single sided key blanks 14 and 16 to duplicate the profile of a double sided or single sided keys 18 and 20, respectively. A unique feature of the invention is that the milling cutters 12A–12C have both rotational movement about and linear reciprocal movement along the axis 22 extending through cutting unit 12 during the key cutting operation. A key clamping support structure 24, on which is mounted one or more key clamping units 26 and 28, reciprocally moves in a linear direction perpendicular to the longitudinal axis 22. The clamping units 26 and 28 are each constructed to clamp the key to be duplicated and its associated key blank in a single joint clamping operation using one compressive force. NOTE: The duplicating key machine according to the present invention is constructed to duplicate either one sided keys or two sided keys but by different clamping units while the preferred embodiment of the key duplicating machine 10 of the present invention is illustrated in FIGS. 1–3 and 4A, several alternative embodiments are shown in FIGS. 4B, 4C, 5, 6, 7, 8, and 9. In order to better describe and explain the present invention, reference will be now made to the following FIGS. 1, 2, and 3.

The duplicating key machine 10, in accordance with the present invention, includes a machine chassis 30 on which is mounted an electrical motor 32 for driving the cutting unit 12, key clamping support structure 24 which is movable in a linear direction perpendicular to axis 22, an eccentric disk or cam device 34 connected to a motor 36 for reciprocally moving clamping support structure 24 in a perpendicular direction to axis 22 by means of spring 224 illustrated in FIG. 2.

Reference is made now to the construction and parts of the cutting unit 12 of the key duplicating machine 10. A partially hollowed cylindrical shaft 38 is rotatably supported at opposite ends with side bearings 40,42 mounted within two upstanding chassis supports 44, 46, respectively, which in turn are coupled to machine chassis 30. Shaft 38 has a fly wheel 48 mounted to one end, which is driven by a pulley transmission strip 50 that is connected to fly wheel 52 attached to motor 32. As shown in FIG. 3, milling cutter 12A is rigidly coupled to a sliding cylindrical bearing 92 which in turn is disposed about the outer peripheral surface of shaft 38. As seen in FIG. 3, shaft 38 has two elongated bored sections 54 and 56 which open at opposite ends 58 and 60 of the shaft. Diametrically opposed elongated slots 62A,62B and 64A, 64B are located through the wall of shaft 38 adjacent the blind end of bored sections 54 and 56, respectively. Note that the length of slots 62A,62B are slightly longer than slots 64A,64B, for reasons which will become apparent in the discussion below. A spring 66 is disposed in bored section 54 and abuts against an end cap 68 at the outer end of the bore and against an elongated, cylindrical pin 70 which extends through slots 62A,62B of shaft 38 for operational engagement with cutter 12A, as discussed below. The head of a pin 72 is biased by spring 66 into engagement with pin 70. A spring 74 is disposed in bored section 56 and abuts against a hollow end cap 76 mounted within the outer end of the bore 56. End cap 76 has cylindrical end section 78 with diametrically opposed slots 80,82 and an arcuate groove 84 formed in the end surface of end cap 76. The inner end of spring 74 engages against an elongated, cylindrical pin 86 which extends through slots 64A,64B of shaft 38 for operational engagement with cutters 12B and 12C, as discussed below. The head of an elongated rod 88 which extends through bored section 56 and into end section 78 of end cap 76 is biased by spring 74 into engagement with pin 86. The outer end of rod 88 has a pin 90 secured therethrough and is slidably received in slots 80 and 82 in end section 78.

A first sliding cylindrical bearing 92 is slidably secured about the outer peripheral surface of shaft 38 by pin 70 and adapted for sliding linear movement with respect to the shaft along the direction of axis 22. Milling cutter 12A is mounted against inner shoulders of bearing 92 so that the ends of pin 70 are received in slots 93 extending radially inward from central opening of cutter 12A to rotate cutter 12A with the rotation of shaft 38. Abutted against cutter 12A is a circular bearing plate 94. A locking cap 96 is secured to the outer end of sliding cylindrical bearing 92. A cylindrical end section of cap 96 is provided to mount a cutting guide arm 100. The locking cap 96 secures the guide arm 100 against bearing plate 94 which in turn secures milling cutter 12A to sliding bearing 92. As discussed in more detail below, milling cutter 12A both rotates about and reciprocates axially to axis 22 with cylindrical bearing 92 while cutting guide 100 is secured so that it only reciprocates axially to axis 22.

A second sliding cylindrical bearing 102 is slidably secured about the outer peripheral surface of shaft 38 by pin 86 and adapted for sliding, reciprocal, linear movement with respect to the shaft along the direction of axis 22. As shown in FIG. 3, second sliding cylindrical bearing 102 is normally abutted against first sliding cylindrical bearing 92. Milling cutter 12B is mounted against an inner shoulder of bearing 102 so that the ends of pins 104 and 106 are received in slots 108 extending radially inward from central opening of cutter 12B to rotate cutter 12B with the rotation of shaft 38. Abutted against cutter 12B is a circular plate 109 having a cylindrical end section on which is seated a cutting guide arm 110. Abutted against plate 109 is a bearing plate 112. A milling cutter 12C is mounted against bearing plate 112 so that the ends of pin 86 are received in slots 114 extending radially inward from the central opening of cutter 12C to rotate cutter 12C with the rotation of shaft 38. Abutted against cutter 12C is a locking cap 116 which is secured to the outer end of sliding cylindrical bearing 102. The locking cap 116 secures the cutter against bearing plate 112 which in turn secures cutting guide 110 against plate 109 so that milling cutter 12B is abutted against the shoulder of sliding bearing 102. As discussed in more detail below, milling cutters 12B and 12C both rotates about and reciprocates linearly to axis 22 with cylindrical sliding bearing 102 while cutting guide 110 is secured so that it only reciprocates axially to axis 22.

According to the invention cutting guide arm 100, as shown in FIGS. 1 and 3, has a central section 116 with a hole 118 therethrough sized to be seated on the cylindrical end section of cap 96. An upper guide arm section 122 with an elbow extends outward from central section 116 and has a guiding blade 124 secured to the end thereof. A lower guide arm section 126 has a U-shaped end section 128 which is mounted to a component 130 which allows guide arm 100 to reciprocate in a linear direction along axis 22 while preventing rotational movement thereabout. The component 130 is mounted within chassis support 44 and includes an elongated spring biased pin 132 which has an inner end that extends beneath U-shaped end 128 whereby the latter slidably engages pin 132 between two spaced stops 134 and 136. The outer end of component 130 extends through a hollow end cap 138 having a cylindrical end section 140 with diametrically cut slots 142 and an arcuate groove 144 formed in the end surface thereof. The inner end of a spring 146 is compressed between stop 136 and the inner bore of end cap 138 so that a pin 148 is seated against the arcuate groove 144 at the end of end cap 138. The pin 148 can be turned into alignment with the slot 142 so that it is biased inward to abut against the bottom surface of the slot whenever the duplicating machine is adjusted for single sided key duplication, as discussed below.

According to the invention, cutting guide arm 110, as shown in FIGS. 1 and 3, has a central section 150 with a hole 152 therethrough sized to be seated on the cylindrical end section of plate 109. An upper guide arm section 154 branches off into two arms elements 156 and 158, each having a guiding blade 160, 162, respectively, secured to the end thereof. The guiding blade 160 is used in conjunction with guide blade 124 for cutting two sided key blanks and the guide blade 162 is used for cutting single key blanks, as will become apparent from the discussion below. A lower guide arm section 164 has a U-shaped end section 168 which is mounted to a component 170 which allows guide arm 110 to move in a linear direction along axis 22 while preventing rotational movement thereabout. The component 170 is mounted within chassis support 46 and includes an elongated pin 172 with an inner end that is located beneath U-shaped end 128 whereby the latter slidably engages pin 172 between two spaced stops 174 and 176 which allows guide arm 110 to reciprocate in a linear direction along axis 22 while preventing rotational movement thereabout.

Referring to FIGS. 1, 2 and 3, there is illustrated an upstanding key support 177 which is secured to chassis 30 and has a flat key supporting surface 179 located just below key blank 14. As the key blank 14 is moved into engagement with cutters 12A and 12B, the blade of blank 14 rests against surface 179 so that the force exerted against the blank key by the counterclockwise rotation of the cutters will not tend to deflect the key since it is being supported by support 177.

The operation of the key duplicating machine for cutting a two sided key blank follows. First the key 18 to be duplicated and the key blank 14 are secured in a key clamping structure, such as clamping structure 26 discussed in detail below. The rotational movement of motor 32 is transferred to shaft 38 through transmission strip 50 and pulley 48 whereby shaft 38, sliding bearings 92, 102, and cutters 12A, 12B rotate together around axis 22. As the key to be duplicated moves between blades 124,160, the cutting guides 100, 110 reciprocate towards and away from each other in accordance with the profile of the grooves formed in opposite sides of the blade of key 18. The linear, reciprocal movement of cutting guides 100,110 causes the sliding bearings 92,102, milling cutters 12A, 12B to move towards and away from each other. Springs 66 and 74 disposed within rotational shaft 38 bias the cutters 12A,12B and cutting guides 100,110 towards each other.

The cutting edges 180A, 182A and 180B, 182B of cutters 12A and 12B, respectively, are facing each other and constructed to cut into the opposite sides of the blade of key blank 14 to duplicate the grooves of a two sided key 18 which is being duplicated. A unique aspect of the invention is that the cutters 12A,12B reciprocate linearly along the axis 22 while the key is being driven into and/or out of the space between the rotating cutters in a direction perpendicular to axis 22. This movement can be distinguished from the prior art where the cutting blade rotated at a set location about an axis.

Figure 4A:
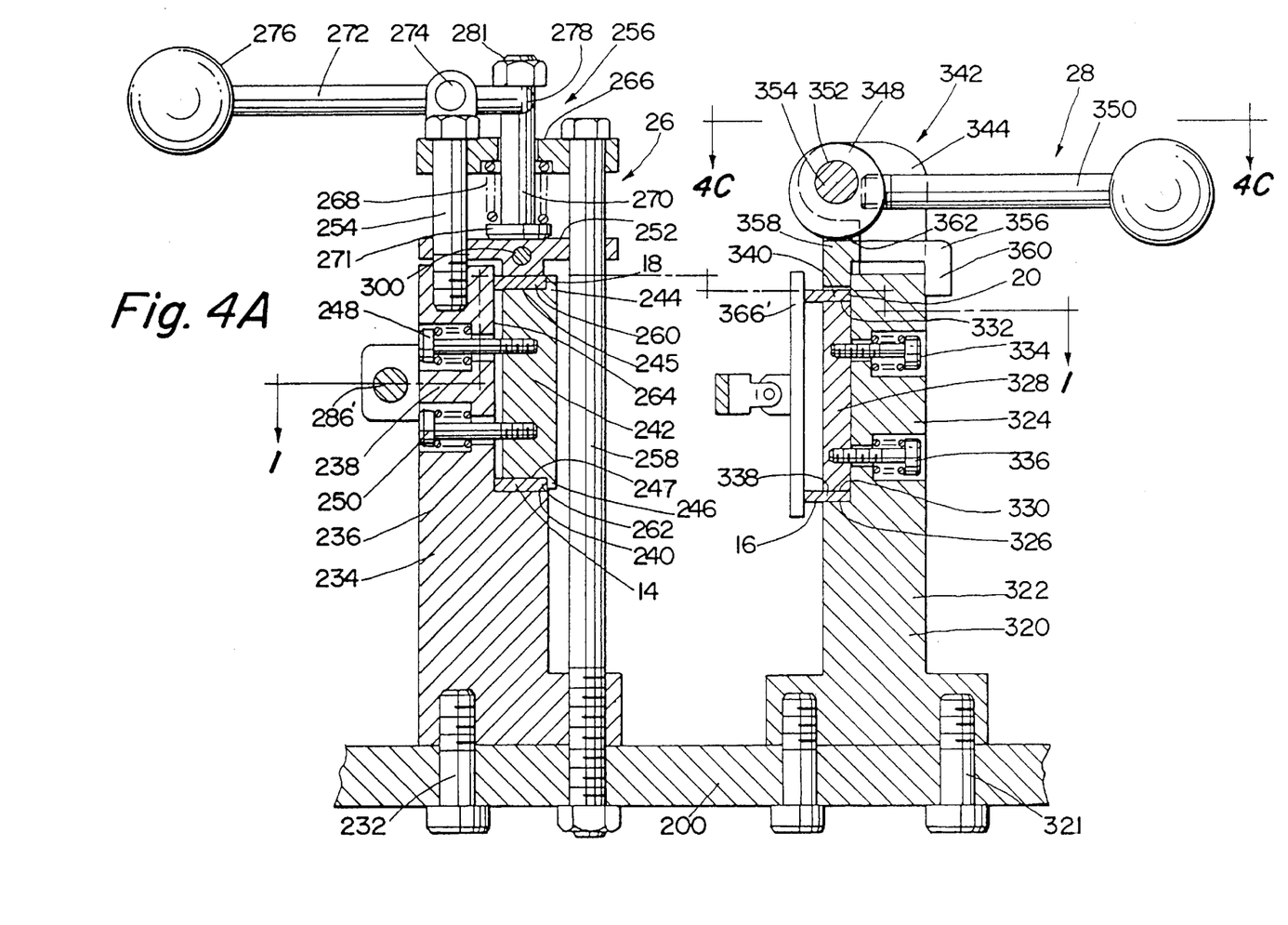
FIG. 4A is a cross-sectional view of the clamping unit through line 4A—4A of FIG. 1 showing clamping units for a two sided key and a one sided key.
Figures 4B, 4E:
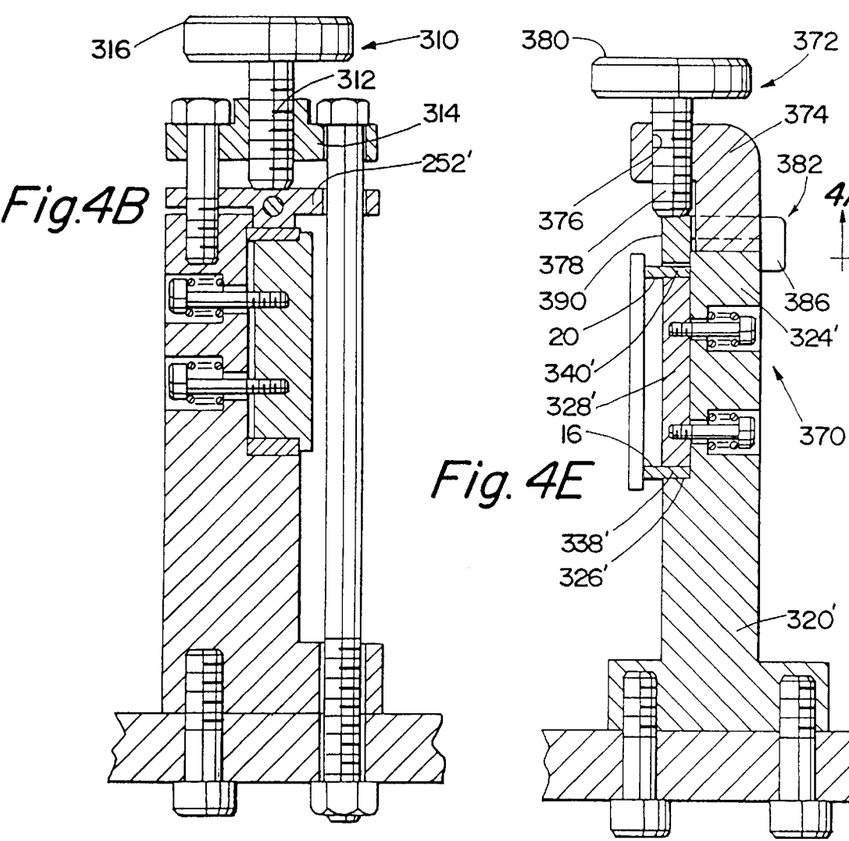
FIG. 4B is a cross-sectional view of an alternative embodiment of a clamping unit adapted for the two sided key clamping unit of FIG. 4A.
FIG. 4E is side view, partly in cross-section, of an alternative embodiment of a clamping unit adapted for the one sided key clamping unit of FIG. 4A.
Figures 4C, 4F:
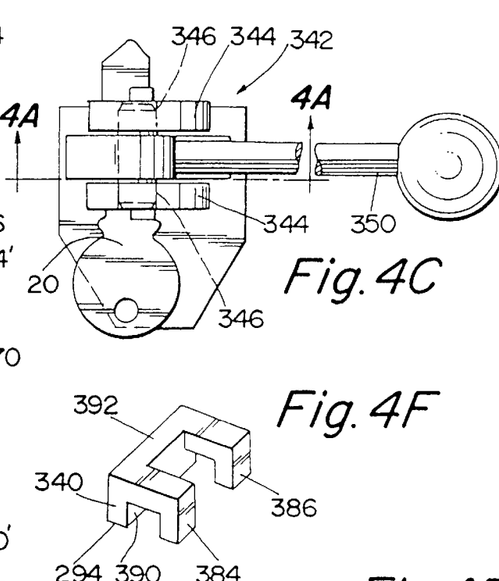
FIG. 4C is a plan view through line 4C—4C of FIG. 4A.
FIG. 4F is a perspective view of a compression component for the clamping unit of FIG. 4E.

Another unique aspect of the embodiment of the invention illustrated in FIGS. 1–3 is the ability to cut a single sided key blank. For this mode of operation, the pin-like handle 90, extending outward from end cap 76, is pulled outward against the bias of spring 74 and twisted to seat the pin 90 in groove 84. Next, pin shaped handle 148 of component 130 is manually twisted from the position as illustrated in FIG. 3 and moved, under the bias of spring 146, into slot 142 so that rod 132 moves to the right. With this setup, spring 66 within shaft 38 exerts a biasing force via pin 70 against sliding sleeve 92 which in turn biases sliding sleeve 102, cutting guide 110, and cutter 12C to the right into a position for cutting a single sided key blank which is clamped into a key clamping structure such as key clamping unit 28 which is adapted for clamping a single sided key 20 to be duplicated and a single sided key blank as illustrated in FIGS. 4A and 4E and discussed hereinafter. As with the cutting of a double sided key blank, the rotational movement of motor 32 is transferred to shaft 38 through transmission strip 50 whereby shaft 38, sliding bearings 92, 102, and cutters 12A, 12B, and 12C rotate together around axis 22. As the key to be duplicated moves against blade 162, the cutting guide 110, sliding bearing 102 and milling cutter 12C move towards in a linear direction with respect to axis 22 through shaft 38 in accordance with the profile of the grooves formed on the single side of the blade of key 20. Spring 66 disposed within rotational shaft 38 biases the cutter 12C and cutting guide 110 against the key blank and the grooves formed on the blade of the key to be duplicated. As described with respect to the cutting of a two sided key, the cutting edges 180C, 182C of cutter 12C are constructed to cut into the side of the blade of key blank 16 to duplicate the grooves of the single sided key 20 which is being duplicated. Here again, cutter 12C reciprocates in the linear direction along the axis 22 while the keys are being driven towards and/or away from the rotating cutter 12C in a direction perpendicular to axis 22.

While any desired device for clamping keys can be incorporated with cutting unit 12, in accordance with a preferred embodiment of the invention, a key clamping assembly 24 is mounted on machine chassis 30. As seen in FIGS. 1 and 2, clamping assembly 24 includes a support base 200 having spaced bores 202 and 204 extending therethrough and located adjacent opposite sides thereof. Support rods 208 and 206 are slidably received in bores 202 and 204, respectively, and are secured to the chassis at opposite ends by support components 210, 212, and 214, 216, respectively. A operating rod 218 is secured at one end to support base 200 and has an end cap 220 at the opposite end. Rod 218 extends through a bore of spring support plate 222. A spring 224 is disposed between spring support plate 222 and end cap 220 to bias end cap 220 into engagement with the peripheral surface of cam 34 so that the rotation of the cam by motor 36 causes the support base to reciprocate back and forth in a direction perpendicular to shaft 38. A microswitch 221 is mounted on chassis 30 to engage cam 34 and turn off the machine 10 after the keys have been cut.

Referring now to FIG. 4A, there is illustrated a clamping unit 26 for clamping a two sided key blank 14 and a two sided key 18 to be duplicated in a single, joint clamping operation. Clamping unit 26 includes an upstanding support 234 which is connected to support base 200 by conventional means, such as bolts 232. Upstanding support 234 has a lower section 236 and a narrow upper section 238 to form a shoulder 240 at the intersection thereof. An intermediate key alignment plate 242 having first and second side compression surfaces 244 and 246 and first and second surface compression surfaces 245 and 247 mounted against upper section 238, as shown in FIG. 4A. The mounted plate 242 is secured to the upper section 238 by spring biased pins 248 and 250. An intermediate compression flange 252 has two bores through opposite sides thereof in which are received mounting means. In the preferred embodiment one of the mounting means is a bolt 254 secured at one end to support 234 and at the other end to a compression unit 256. The other mounting means is an elongated bolt 258 secured at one end to the support base 200 and at the other end to compression unit 256 for connecting all parts of the clamping unit 26 together. Clamping unit 26 has two spaced slots 260 and 262 formed between the alignment plate 242 and the shoulder 240 and the compression flange 252 for clamping the key to be duplicated 18 and the blank key 14. The first compression surface 244 of plate 242 is provided for compressing one surface of the key 18 to be duplicated and the second compression surface 246 on its other end is provided for compressing one surface of the blank key 14 against the forward facing surface 264 of the upper section 238 of the clamping unit 234 during the clamping operation, as described below. This compression insures that the two keys are correctly aligned with respect to each other.

In addition, clamping unit 26 includes a compression unit 256, which can be any conventional compression unit. In the preferred embodiment, the compression unit 256 is connected to the clamping unit by bolts 254 and 258 which extend through an upper flange 266. A compression spring 268 is mounted on a central pin 270 having a shoulder 271 which compresses intermediate compression flange 252 the key 18 to be duplicated, the intermediate plate 242 and the key blank 14. Accordingly, the compression power of compression spring 268 clamps both the key to be duplicated and the key blank in one operation and by one compression power.

A shut-off handle 272 for opening and closing the clamping unit 26 is constructed to rotate around a shaft 274 is connected to the compression unit 256. One end of the shut-off handle 272 engages central pin 270 so that by manually press on one end 276 of the shut-off handle the shoulder 278 at the other end of handle 272 pushes against a nut 281 secured to central pin 270 and moves the central pin upward to relieve the compressive force from the clamping unit and allow the key 18 to be duplicated and the key blank 14 to be inserted or removed from the slots 260 and 262, respectively. When the handle 272 is released, the compressive power of spring 268 is again exerted against intermediate flange 252 to again apply compressive force to the clamping unit 26. It will be understood by an appropriate skilled person that the compression unit which applies the compressive force can be any conventional compression unit.

Clamping unit 26 further includes a clamping guide 280 which has a first position, as shown in FIG. 1, that insures that the key blank 14 and the key 18 to be duplicated are correctly positioned with their tip ends at the same location during by clamping operation. The clamping guide 280 is constructed to rotate away from the keys to a second position before the blank key cutting operation and to return to the first position after the cutting and duplicating key operation. The clamping guide 280 comprises a guiding plate 282 which abuts against the tips of both the blades of the key blank and the key to be duplicated when those keys are placed in the clamping unit 26. The guiding plate 282 is connected to one side of a guiding plate arm 284, as shown in FIG. 1 which in turn is connected at its other end to one side of a rotating rod 286 and to one end of a retrieving spring 288. The retrieving spring 288 is connected at its opposite end to the clamping unit 26 so that the spring can rotate guiding plate 282 to the second position or to exert a force of rotation on the plate 282 when the latter returns to its first positioning place depending on how the spring is adjusted. In this case said spring operates in one direction bias to cam surface 292. The rotating rod 286 is connected at its other end to a member 290 with a cam surface 292. An adjustable sliding pin 294 is connected to the chassis 30 by a rod 296 so as to adjust its linear position whereby it engages cam surface 292 of member 290 to rotate rod 286 when support base 200 moves in a linear direction away from the cutting unit 12. Accordingly, the member 290 causes the clamping guide 280 to return to its first position after the key cutting operation against the bias of spring 288. It is also within the scope of the invention to operate the clamping guide in an opposite manner, i.e. to spring bias the guiding plate to the second position and rotate it back against the spring bias to the first position, in a different construction, as will be appreciated by one skilled in the art.

The clamping unit 26 can also include a linear movable rod 300 arranged to spread cutters 12A and 12B and their associated cutter blades 124 and 160, respectively, during the forward movement support 200 so that the key cutting operation only commences when the linear support 200 begins to move back, that is away from the cutters 12A and 12B. The movable linear rod 300 reciprocates within a hole 301 located through the upper intermediate plate 242 of clamping unit 26 and above the key 18 to be duplicated. Rod 300 has an enlarge cylindrical end 302 whose diameter is generally larger than the width of the blade of key 18, the other end of rod 300 has a stopping nut 303. As the support 200 moves towards the cutter unit 12, the tip of cylindrical end 302 moves into the space between cutter blades 124 and 160 and causes the cutters 12A and 12B to spread open to a distance greater than the width of the key to be duplicated. When the support reaches the end of its movement towards the cutters 12A and 12B, a rear section 304 of rod 300 having a diameter which is approximately equal to or less than the space between the cutters 12A and 12B before a key separates blades 124 and 160, as shown in FIG. 1, is disposed between the blades and they move back towards each other. Then, as support 200 returns to its initial position, prior to the cutting operation, the section 302 is clamped by the cutters and the rear section 304 of rod 300 which moves freely in hole 301 is between the cutter blades so that the cutter 12A and 12B engage the key blank so that the cutting operation commences from the innermost portion of the blade as linear support 200 starts to move back. This construction is advantageous because it reduces the time of the cutting operation and insures a more precise duplication of the key to be duplicated.

While the compression unit 256, as illustrated in FIG. 4A, is effective to clamp the keys in a single operation as discussed above, an alternative embodiment is illustrated in FIG. 4B wherein a compression unit 310 can be used in conjunction with clamping unit 26 as illustrated in FIG. 4A. The compression unit 310 includes a screw shaft 312 moving within an upper flange 314 connected to an handle 316. By rotating handle 316 in one direction, the screw shaft 312 presses on the intermediate flange 252' in order to clamp the clamping unit 26. Rotation of handle in the opposite direction cause the relief of clamping unit 26.

It can be appreciated that each of the cutters 12A and 12B of cutting unit 12 are mounted on a different sliding bearing 92 and 102 for cutting grooves of a two sided key blank during the same linear movement. Each of said cutters is guided by a different guiding blade which slides on a different side of the two sided key grooves, such that the duplication of grooves on both sides of the key blank is operated in one joint linear movement. Cutter 12C, as previously discussed is constructed to enable the duplication of one sided key grooves. The cutting blade 162 is jointly mounted on cutting guide 110 located on sliding bearing 102 on which cutter 12B is also mounted and will operate during the one sided key duplication operation.

Figure 4D:
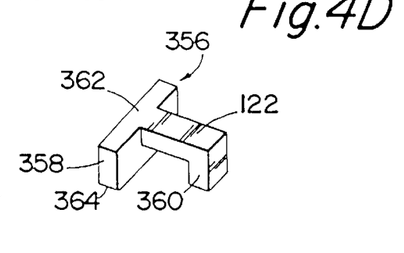
FIG. 4D is a perspective view of a compression component for the clamping unit of FIG. 4C.

Referring again to FIGS. 1, 4A and 4C, there is shown a clamping unit 28 which is constructed to clamp especially but not limited a single sided key blank 16 and a single sided key 20 to be duplicated. Clamping unit 28 includes an upstanding support 320 which is connected to support base 200 by conventional means, such as bolts 321. Upstanding support 320 has a lower section 322 and a narrow upper section 324 to form a shoulder 326 at the intersection thereof. An intermediate key alignment plate 328 has a first compression surface 330 at one end for compressing one surface of the key blank and a second compression surface 328 on its other end for compressing one surface of the key to be duplicated during clamping operation. The mounting plate 328 is secured to the upper section 324 by spring biased pins 334 and 336. Clamping unit 28 has two spaced slots 338 and 340 formed between the alignment plate 328 and the shoulder 326 and an eccentric compression unit 342 for clamping the key to be duplicated 20 and the blank key 16. The clamping unit includes a compression unit 342 which can be any conventional compression unit but in the preferred embodiment of the present invention the compression unit, as illustrated in FIG. 4A, has shoulders 344 connected to the upper section 324 of support 320. The compression shoulders 344 each have a hole 346 disposed therethrough. An eccentric disk 348 is disposed between the shoulders 344 is connected to a shut-off handle 350. The eccentric disk has a hole 352 offset to the perimeter of the eccentric shaped disk. A pin 354 passes through the shoulder holes 346 and through the hole 352 disposed on disk 348 in order to allow the eccentric disk 348 to rotate about the axis of pin 354. A compression component 356 having two spaced shoulders 358 and 360, as shown in FIG. 4D, is mounted to slide on the upper section 324 of clamping unit to either move downwards and press on the upper surface of the key to be duplicated in slot 340 or to be free so that the key can be either inserted or removed from the slot. One shoulder 362 of compression component 356 has two compression surfaces 362 and 364 disposed on opposite ends thereof. Compression surface 362 is disposed with respect to disk 348 to receive pressure from the circumferential surface and the other compression surface 364 is located to exert a clamping force on the upper surface of key 20. The clamping operation is performed by manually rotating handle 350 about pin 354 to rotate disk 348 so that the eccentric disk 348 rotates and forces compression component 356 against key 20, which in turn is pressed against alignment plate 328. The alignment plate in turn press against key 16 against shoulder 326. The result is that with the actuation of a single compression unit 342 both keys 16 and 20 are either clamped together or released from the clamping unit 28.

Clamping unit 28 also includes a guiding unit 365, as illustrated in FIG. 1, for properly aligning the single sided key to be duplicated 20 and the key blank 16 in the clamping unit. Guiding unit 365 has a guiding plate 366 connected to one end of a first arm 367. The opposite end of the arm 367 is connected to a sleeve 368 having one end of a second arm 369 secured thereto. The opposite end of arm 369 is connected to a spring 371 which in turn is connected to support unit 200 by conventional means such as a screw 373. The sleeve 368 is constructed to rotate about a pin 375 disposed therein and mounted to support unit 200. A second pin 377, connected to the chassis 30 by means such as a screw 379, is disposed between pin 375 and arm 369. In operation of guiding unit 365, the guiding plate 366 is biased by spring 371 against the shoulders of the key blank and the key to be duplicated 20, as shown in FIGS. 1 and 4A. The guiding plate 366 acts to press the sides of the blades of both keys against upstanding support 320 to properly align and secure them in a parallel relation to each other. When the movable support 200 starts to move forward towards the cutting unit 12, pin 377 engages arm 369 and causes arm 369 and arm 367 to rotate about pin 375 which in turn causes plate 366 to disengage from key 20. Then, key 20 can move to the cutter 12C without interference from guiding unit 365. When support 200 returns to its initial position, as shown, the pin 377 engages arm 369 and forces it to rotate against the bias of spring 371 about pin 375 so that guiding plate 366 returns to a position to again align the keys during the clamping operation.

Referring now to FIG. 4E, there is illustrated an alternative embodiment of a single sided key clamping unit 370 which can be substituted for the single sided key clamping unit 28 just described. Clamping unit 370 incorporates a modified compression unit 372 which can replace compression unit 342 with clamping unit 28 as illustrated in FIG. 4A. The compression unit 372 includes a shoulder 374 extending outward from support 320' with a vertically disposed threaded hole 376 extending therethrough. Throughout the specification, primed numbers represent structural elements which are substantially identical to structural elements represented by the same unprimed number. A threaded pin 378, having a conventional shut off handle 380 at one end, is rotatably mounted in hole 376. A compression element 382, as shown in FIG. 4E, is similar to compression element 356 in FIG. 4D but has two spaced shoulders 384 and 386 at one end thereof and an elongated shoulder 390 at the other side thereof. Compression surfaces 392 and 394 are located on opposite sides of shoulder 390. When assembled, the shoulder 374 extending from support 320' is disposed between shoulders 384 and 386 so that shoulders 390 and 384, and 386 are mounted to slide on the upper section 324' of the clamping unit to either move downwards and clamp both keys 16 and 20 in place or to be freely supported to allow the keys to be inserted or removed from slots 338' and 340'. The clamping operation is performed by manually turning handle 380 and pin 378 towards against compression surface 392 which in turn presses compression surface 394 of compression element 382 which in turn is pressed against alignment plate 328'. The alignment plate in turn presses key 16 against shoulder 326'. As with the embodiment in FIG. 4A, with the actuation of a single compression unit 370, both keys 16 and 20 are either clamped together or released from the clamping unit 28. It can further be appreciated that the innovation of the clamping units 28, constructed and operative in accordance with the present invention, is that the key blank and the key to be duplicated are clamped in one clamping unit with one clamping power. The vector of the power operates on both axis of the key blades.

Figures 5, 5A:
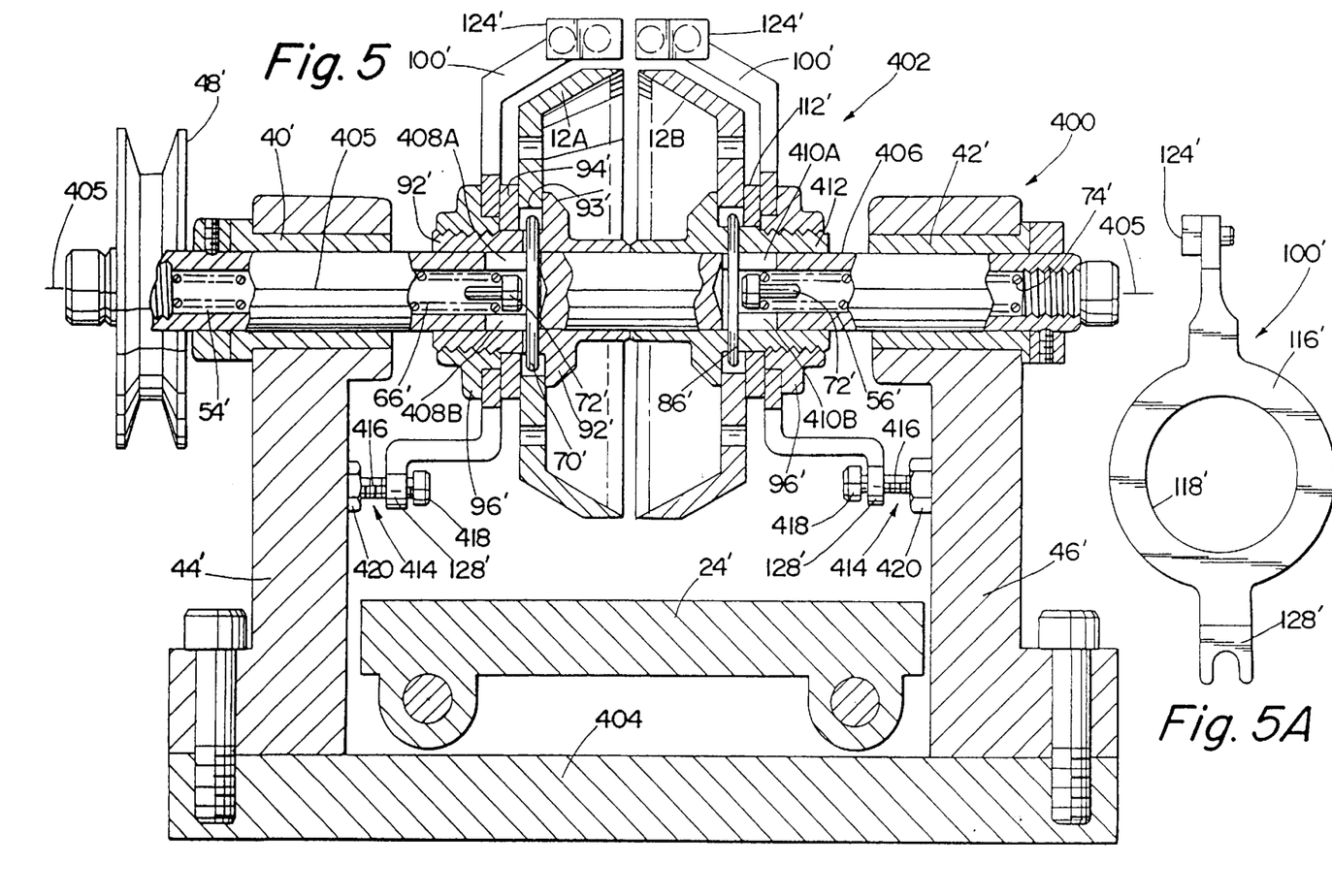
FIG. 5 is a side cross-sectional view of a key duplicating machine, similar to the key duplicating machine of FIG. 1 but with only two cutters.
FIG. 5A is a sideview of a cutting guide.

Referring to FIG. 5, there is illustrated an alternative embodiment of the invention wherein a duplicating key machine 400 has a cutting unit 402 with two cutters 12A and 12B which incorporates the operating features of the two cutters 12A and 12B of FIGS. 1–3. The duplicating key machine 400, in accordance with the present invention, includes a machine chassis 404 on which is mounted an electrical motor (not shown) for driving the cutting unit 402, key clamping support structure 24' which is movable in a linear direction transverse to axis 405, and a cam device connected to a motor (not shown) for reciprocally moving clamping support structure 24' in the transverse direction to axis 405.

Reference is made now to the construction and parts of the cutting unit 402 of the key duplicating machine 400 which is described in more general terms since the operation is essentially identical to the operation of the two sided key cutting portion of the key duplicating machine 10 described before. A hollow cylindrical shaft 406 is rotatably supported at opposite ends within side bearings 40', 42' mounted within two upstanding chassis supports 44', 46', respectively, which in turn are securely mounted to machine chassis 404. Shaft 406 is driven by a fly wheel 48'. Milling cutter 12A is rigidly secured to a sliding cylindrical bearing 92' which is slidably mounted on the outer peripheral surface of shaft 406. Shaft 406 has two elongated bored sections 54' and 56' which open at opposite ends of the shaft. Diametrically opposed elongated slots 408A, 408B and 410A, 410B are located through the wall of shaft 406 adjacent the blind end of bored sections 54' and 56', respectively. A spring 66' is disposed in bored section 54' and abuts against an end cap at the outer end of the bore and against an elongated, cylindrical pin 70' which extends through slots 408A, 408B of shaft 406 for operational engagement with cutter 12A, as discussed below. The head of a pin 72' is biased by spring 66' into engagement with pin 70'. A spring 74' is disposed in bored section 56' and abuts against a hollow end cap mounted within the outer end of the bore 56'. The inner end of spring 74' engages against an elongated, cylindrical pin 86' which extends through slots 410A,410B of shaft 406 for operational engagement with cutters 12B, as discussed below. The head of a pin 72' is biased by spring 74' into engagement with pin 86'.

A first sliding cylindrical bearing 92' is slidably secured about the outer peripheral surface of shaft 406 by pin 70' and adapted for sliding linear movement with respect to the shaft along the direction of axis 405. Milling cutter 12A is mounted against an inner shoulder of bearing 92' so that the ends of pin 70' are received in slots 93' extending radially inward from central opening of cutter 12A to rotate cutter 12A with the rotation of shaft 406. Abutted against cutter 12A is a circular bearing plate 94'. A locking nut 96' is secured to the outer end of sliding cylindrical bearing 92'. A cylindrical end section of nut 96' is provided to mount a cutting guide 100'. The locking nut 96' secures the guide 100' against bearing plate 94' which in turn secures milling cutter 12A to sliding bearing 92'. For reasons previously explained, cutting blade 12A both rotates about and reciprocates axially to axis 405 with cylindrical bearing 92' while cutting guide 100' is secured so that it only reciprocates with milling cutters 12A and cylindrical bearing 92' axially to axis 405.

A second sliding cylindrical bearing 412, which is essentially identical to bearing 92', is slidably secured about the outer peripheral surface of shaft 406 by pin 86' and adapted for sliding, reciprocal, linear movement with respect to the shaft along the direction of axis 405. The first and second sliding cylindrical bearings 92' and 412 are normally abutted against each other. Milling cutter 12B is mounted against an inner shoulder of bearing 412 so that the ends of pin 86' are received in a slot extending radially inward from the central opening of cutter 12B to rotate cutter 12B with the rotation of shaft 406. Abutted against cutter 12B is bearing plate 112'. A locking nut 96' is secured to the outer end of sliding cylindrical bearing 412. A cylindrical end section of nut 96' is provided to mount a cutting guide 100'. The locking nut 96' secures the guide 100' against bearing plate 112' which in turn secures milling cutter 12B to sliding bearing 412. As with milling cutter 12A, milling cutter 12B both rotates about and reciprocates linearly to axis 405 with cylindrical sliding bearing 412 while cutting guide 100' is secured so that it only reciprocates axially with milling cutter 12B and cylindrical bearing 412 axially to axis 405.

According to the invention cutting guides 100' with guiding blades 124 secured thereon, as shown in FIG. 5A, have U-shaped end sections 128' which are mounted to identical pin components 414 which allow the cutting guides 100' to reciprocate in the linear direction along axis 405 while preventing rotational movement thereabout. The pin components 414 are secured to the upstanding chassis supports 46' and 44 include elongated pins 416 having an enlarged head 418 at the free end. The pins 416 extends beneath U-shaped ends 128' whereby the latter slidably engage pin 416 and reciprocate in a linear direction between outer head 418 and an inner stop 420 while preventing rotational movement thereabout.

The operation of the key duplicating machine 400 for cutting a two sided key blank is substantially identical to the operation of the machine 10 described before. It is further within the scope of the invention for duplicating machine 400 to cut both single sided and double sided key blanks. The keys are secured in a key clamping structure, such as clamping units 26 or 28, as previously discussed, mounted on a reciprocal support 200'. It is also in within the terms of the present invention to use any other appropriate key clamping mechanism or support mechanism to direct the keys into the pair of milling cutters 12A and 12B.

Figure 6:
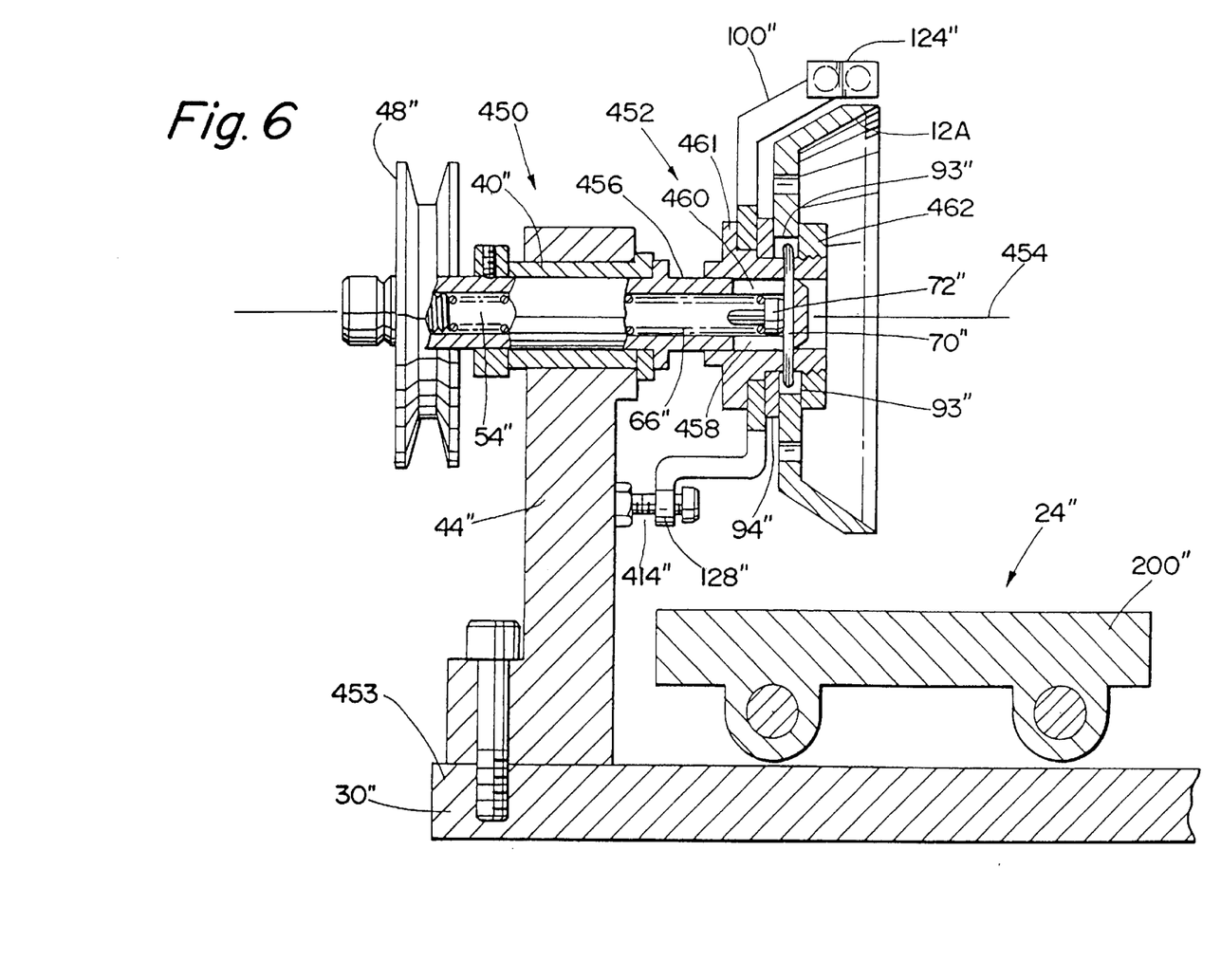
FIG. 6 is a side view, in cross-section, of an alternative embodiment of a key duplicating machine having a single key cutter with a single guiding unit.

Referring to FIG. 6, there is illustrated an alternative embodiment of the present invention wherein a duplicating key machine 450 has a cutting unit 452 with a single milling cutter 12A which incorporates the operating features of the single cutter 12C of FIGS. 1–3. The duplicating key machine 450, in accordance with the present invention, includes a machine chassis 453 on which is mounted an electrical motor (not shown) for driving the cutting unit 452, the cutting unit 452, a key clamping support structure 24" which is movable in a linear direction transverse to axis 454, and a cam device (not shown) connected to a motor (not shown) for reciprocally moving the clamping support structure 24" in the transverse direction to axis 454 in the manner discussed before with regards to the embodiment shown in FIGS. 1–3. Support structure 24" can also be moved manually without a cam device.

Reference is made now to the construction and parts of the cutting unit 452 of the key duplicating machine 450 which is described in more general terms since the operation is essentially identical to the operation of the single sided key cutting portion of the key duplicating machine 10 described before. A hollow cylindrical shaft 456 is rotatably supported within a side bearing 40" mounted on an upstanding chassis support 44" which in turn is secured to machine chassis 453. Shaft 456 is driven by a fly wheel 48". Milling cutter 12A is rigidly secured to a sliding cylindrical bearing 461 which is slidably mounted on the outer peripheral surface of shaft 456. Shaft 456 has an elongated bored section 54" which opens at one end of the shaft. Diametrically opposed, elongated slots 458, 460 are located through the wall of shaft 456 adjacent the blind end of bored section 54". A spring 66" is disposed in bored section 54" and abuts against an end cap at the outer end of the bore against the head of a pin 72", which in turn abuts a cylindrical pin 70" that extends through slots 458,460 of shaft 456 for operational engagement with cutter 12A, in the manner previously discussed.

Sliding cylindrical bearing 461 is slidably secured about the outer peripheral surface of shaft 456 by pin 70" and is adapted for sliding, linear, reciprocating movement with respect to the shaft 456 along the direction of axis 454. Milling cutter 12A is mounted against a locking end nut 462 secured to an outer end of bearing 461 so that the ends of pin 70" are received in a slot 93" extending radially inward from central opening of cutter 12A to rotate cutter 12A with the rotation of shaft 456. Abutted against cutter 12A is a circular bearing plate 94". A cylindrical end section of bearing 461 is provided to mount a cutting guide 100". The locking end nut 462 forces the cutter 12A against the bearing plate 94" which in turn presses the guide 100" against the cylindrical end section of sliding bearing 461. For reasons previously explained, cutting blade 12A both rotates about and reciprocates axially to axis 454 with cylindrical bearing 461 while cutting guide 100" is mounted on bearing 461 so that it only reciprocates with cutting blade 12A and cylindrical bearing 461 axially to axis 454.

According to the invention, cutting guide 100", as shown in FIG. 6, has a U-shaped end section 128" which is mounted to a pin component 414" that allows the guide 100" to reciprocate in the linear direction with respect to axis 454 while preventing rotational movement thereabout.

The operation of the key duplicating machine 450, for cutting a single sided key blank, is substantially identical to the operation of the machine 10 described before. Duplicating machine 450 is especially directed to but not limited to cutting single sided key blanks. The keys are secured in a key clamping unit, such as the clamping unit 26 previously discussed, and mounted on a reciprocating support 200". It is also in within the terms of the present invention to use any other appropriate key clamping device to direct the keys into the milling cutter 12A.

Figures 7, 7A, 7B, 7C:
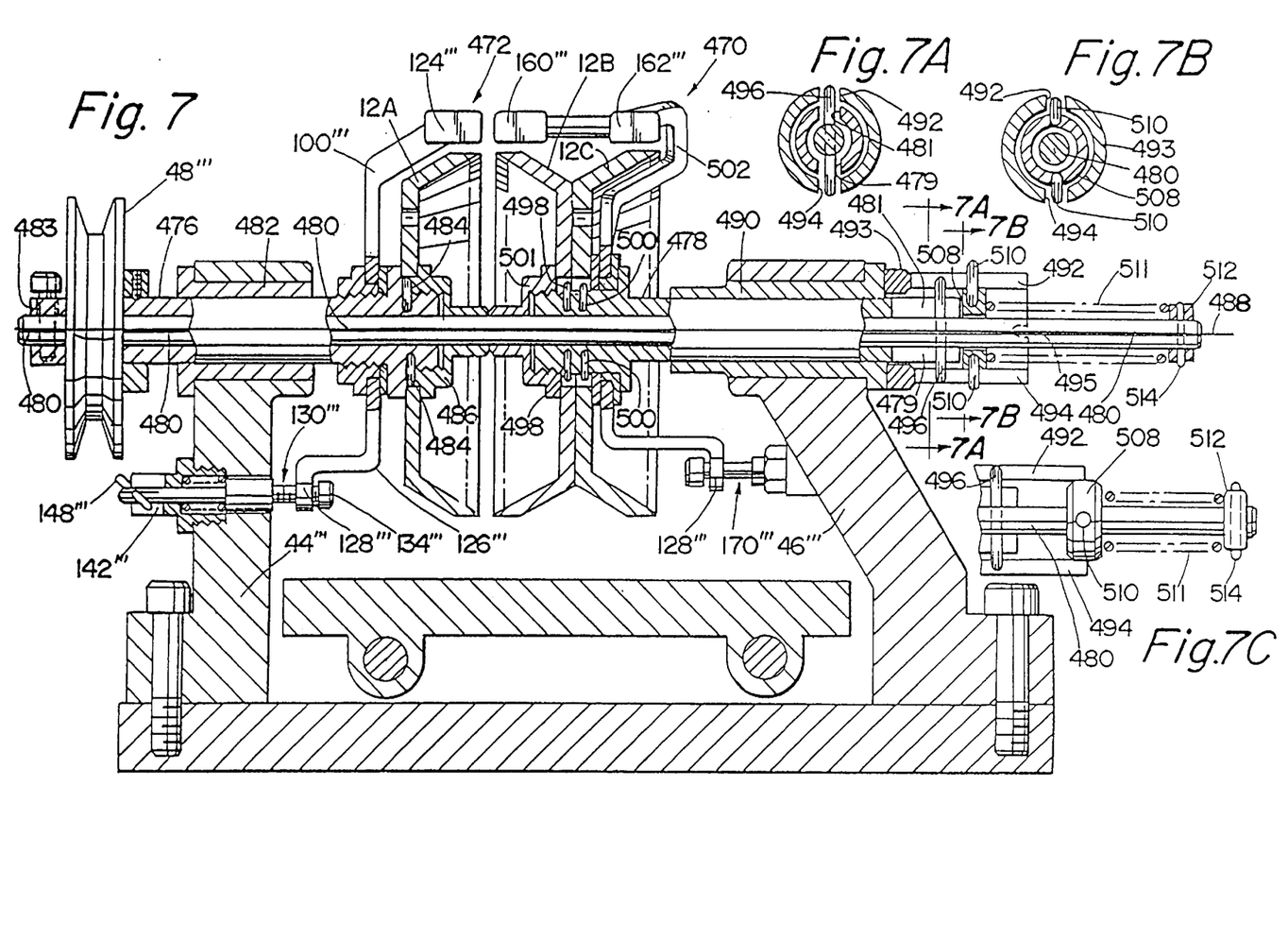
FIG. 7 is a cross-section of an alternative embodiment of the key duplicating machine of FIG. 1 with an externally mounted biasing spring.
FIG. 7A is a view through line 7A—7A of FIG. 7.
FIG. 7B is a view through line 7B—7B of FIG. 7.
FIG. 7C shows the machine of FIG. 7 with the spring compressed for single cutter operation.

Referring to FIG. 7, there is illustrated an alternative embodiment of the present invention wherein a duplicating key machine 470 is similar to the key duplicating machine of FIG. 1. Referring now to FIG. 7, a cutting unit 472 includes milling cutters 12A,12B and 12C, mounted on first and second hollow rotational shafts 476 and 478 having an elongated internal rod 480 extending therethrough. The first rotational shaft 476 is slidably disposed within a bearing 482 secured to a first chassis support 44'''. Rotational shaft 476 has one end coupled to a transmission wheel 48''' that is driven by a belt connected to the transmission wheel of a motor (not shown), as previously discussed. A first end of shaft 476 is connected by conventional means such as a pin 483, to the longitudinal internal rod 480 disposed within the internal bore of rotational shaft 476. The second opposite end of first rotational shaft 476 is coupled to cutter 12A and fixedly mounted thereto by pins 484 and a threaded end nut 486 secured to shaft 476. A first guiding unit 100''' is secured to rotational shaft 476 to enable guiding unit 100''' to move linearly with the rotational shaft 476 and cutter 12A along the axis of rod 480 through the shaft 476 and the rod 480 without rotating during the rotational movement of the shaft and the cutter. The cutting unit 472 also includes a second rotational shaft 478 disposed within a second bearing 490 secured within a second chassis support 46'''. The first outer end of shaft 478 has diametrically opposed slots 479 and 481. Bearing 493, located adjacent to the first end of the second rotational shaft 478, has diametrically opposed slots 492, 494 which receive a pin 496 that is coupled to the elongated internal rod 480 and extends through slots 479, 481, as shown in FIG. 7A. The end of bearing 493 has a groove 495. Pin 496 transfers the rotational movement from the internal rod 480 to the second rotational shaft 478 and bearing 493. The pin 496 slides within the two slots 479, 481 of shaft 478 and within slots 492, 494 provided on bearing 493. The second opposite end of second rotational shaft 478 is coupled to cutters 12B and 12C by pins 498 and 500, respectively, and a threaded end nut 501 secured to shaft 478. The second end of shaft 478 communicates with a second guiding unit 502 which is constructed in a manner similar to guiding unit 110 of machine 10 to move with cutters 12B and 12C and with the second rotational shaft 478 linearly along the axis 488 through the second rotational shaft without rotating during the rotational movement of cutters 12B and 12C and the second rotational shaft, as discussed below. The second guiding unit 502 includes first and second guiding blades 160''' and 162'''. Blade 160''' is located adjacent to cutter 12B for guiding cutter 12B during the cutting operation. Guiding blade 162''' is located adjacent to cutter 12C for guiding cutter 12C during cutting operation. The first and second guiding units 100''' and 502 each have U-shaped end sections 128''' which are mounted to components 130''' and 170''', respectively, which allow guide units 100''' and 502 to move in a linear direction along axis 488 while preventing rotational movement thereabout.

Referring again to FIG. 7, the outer end of second shaft 478 has two diametrically opposed, longitudinal slots 479 and 481. A sliding disk 508 having a central bore therethough is disposed adjacent to the outer end of sliding shaft 478 and within the open bore of bearing 493 disposed adjacent to the outer end of bearing 490 with the rod 480 extending through the bore. As shown in FIG. 7B, two pins 510 are secured to disk 508 within bearing 493 and project outward through slots 492 and 494 for sliding engagement therewith. One side of the sliding disk 508 presses the end of second rotational shaft 478 and the other end of the sliding disk is engaged by one end of a compression spring 511 located about the longitudinal rod 480. The opposite end of the compression spring 511 is abutted against a disk 512 fixedly coupled to the longitudinal rod by conventional means such as pin or screw 514. One end of the compression spring 511 is biased against sliding disk 508 which in turn biases the second rotational shaft 478 with cutter 12B toward cutter 12A. The opposite end of compression spring 511 is abutted against the disk 512 in order to pull the longitudinal rod 480 connected to rotational shaft 476 by pin 483 and push first rotational shaft 476 with cutter 12A towards cutter 12B. The biasing force of compression spring 511 on the sliding disk 508 and on the disk 512 biases cutter 12A with guiding unit 100''' and blade 124 towards cutter 12B with guiding unit 502 and blade 160''' toward each other.

To duplicate two sided keys, it is preferred to use cutters 12A and 12B in a manner as previously described with respect to FIGS. 1–3. To duplicate a one sided key, it is preferred to use cutter 12C in the manner described in FIGS.

1–3. However, the single cutter 12C can be used to cut two sided keys by simply turning both the key to be duplicated and the blank key over after the grooves in the first side of the blank are cut. Of course, cutters 12A and 12B can be used to duplicate a one sided key, if desired.

In order to use cutter 12C for cutting a single sided key, sliding disk 508 must be moved to the end of bearing 493 and twisted in such way that pins 510 will engage groove 495, as illustrated in FIG. 7C. Also, component 130''' is adjusted by turning twisting handle 148''' so that the handle is based to the right within slots 142''' to permit the end cap 134''' to move from a corresponding distance to the right. When pin 510 is within groove 495, sliding disk 508 does not press the end of second rotational shaft 478 but only acts as a stop for spring 511 to press against disk 512 to pull the first rotational shaft 476 by means of internal rod 480 and pin 483 and first rotational shaft 476 towards second rotational shaft 478 and exert a biasing force against the second rotational shaft, so that compression spring 511, in effect, biases cutter 12C, guiding arm 502 and guiding blade 162''' to perform the cutting and duplicating operation.

Figure 8:
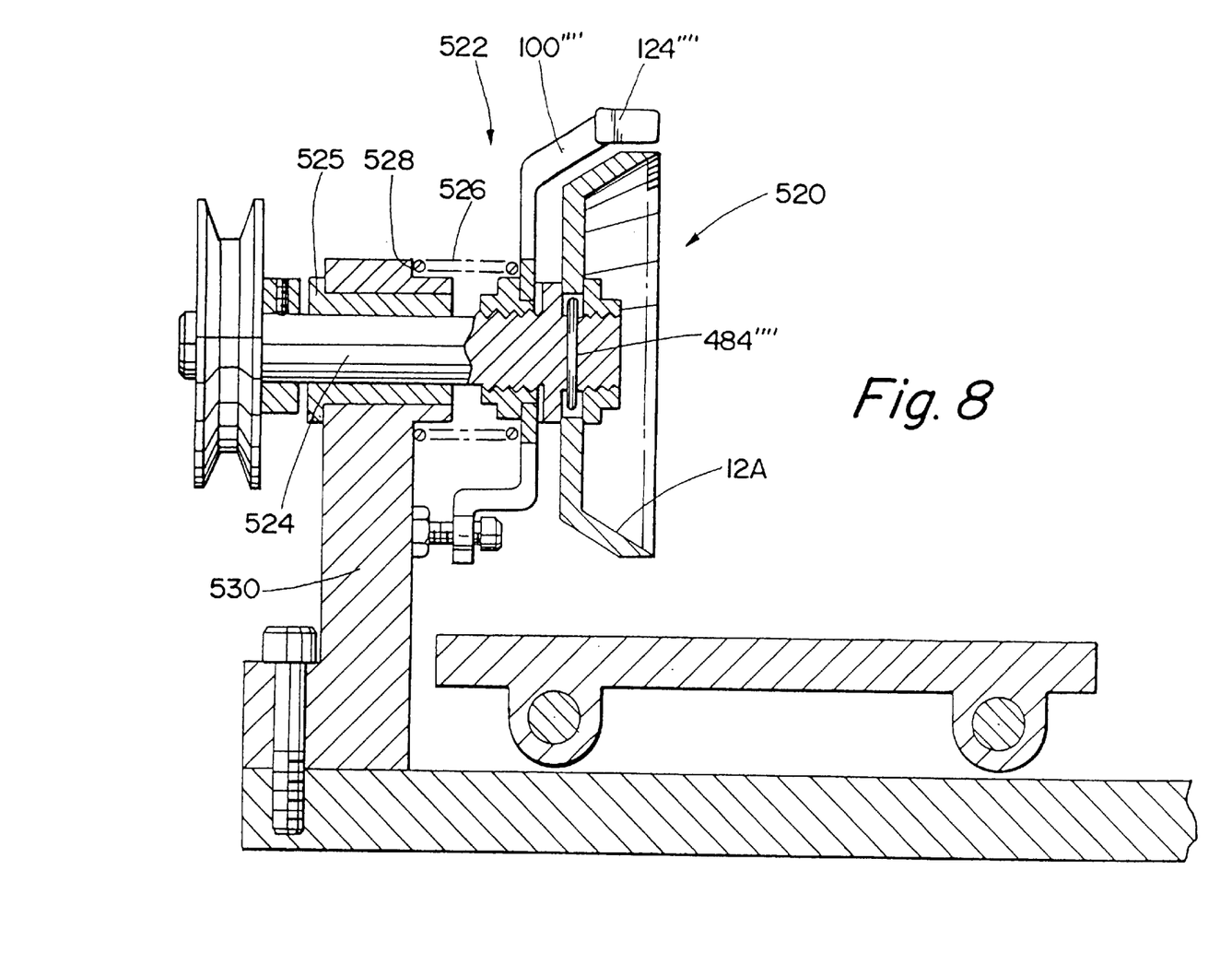
FIG. 8 is a side view, in cross-section, of an alternative embodiment of a key duplicating machine; having a single cutter, a single guiding unit and a single rotational shaft.

Referring now to FIG. 8, there is illustrated another preferred embodiment of a key duplicating machine 520 similar to the preferred embodiment as described in FIG. 7. The cutting unit 522 includes a rotational shaft 524 having a cutter 12A and a guiding unit 100'''' secured thereto. Shaft 524 is mounted within a bearing 525, which in turn is secured to a support 530 connected to the chassis. An external compression spring 526 surrounds rotational shaft 524 between guiding unit 100'''' and a shoulder 528 disposed on chassis support 530. The construction of machine 520, as illustrated in FIG. 8, highlights the main features of the present invention. That is, a single shaft 524 serves as a support for the linear movement of cutter 12A and its associated guiding unit 100''''. As discussed in detail before, any desired type of clamping unit can feed the key to be duplicated and the key blank towards the cutter 12A. The embodiment shown in FIG. 8 can be used for cutting both single sided and double sided keys. This design is advantageous because the reduced number of features results in low cost production and maintenance, simplicity of operation, and efficiency of the machine.

Figure 9:
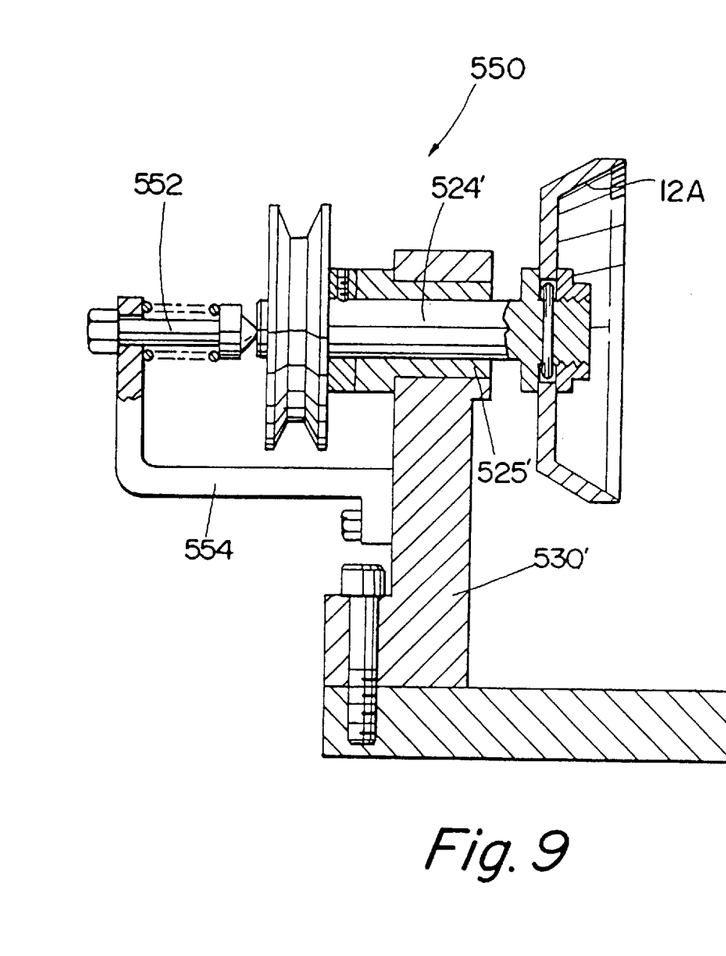
FIG. 9 is a side view, in cross-section of an alternative embodiment of a key duplicating machine having a single cutter mounted on a single spring, longitudinally movable shaft.

Referring to FIG. 9, there is illustrated an embodiment of a key duplicating machine 550, similar to FIG. 8, wherein a linearly movable shaft 524' is mounted in a bearing 525'. The shaft 524' is biased by a spring biased pin 552, mounted on a support 554 which in turn can be connected to upstanding support 530'. The guiding unit and key clamping unit (not shown) can be provided by conventional mechanisms as desired.

Figure 10:
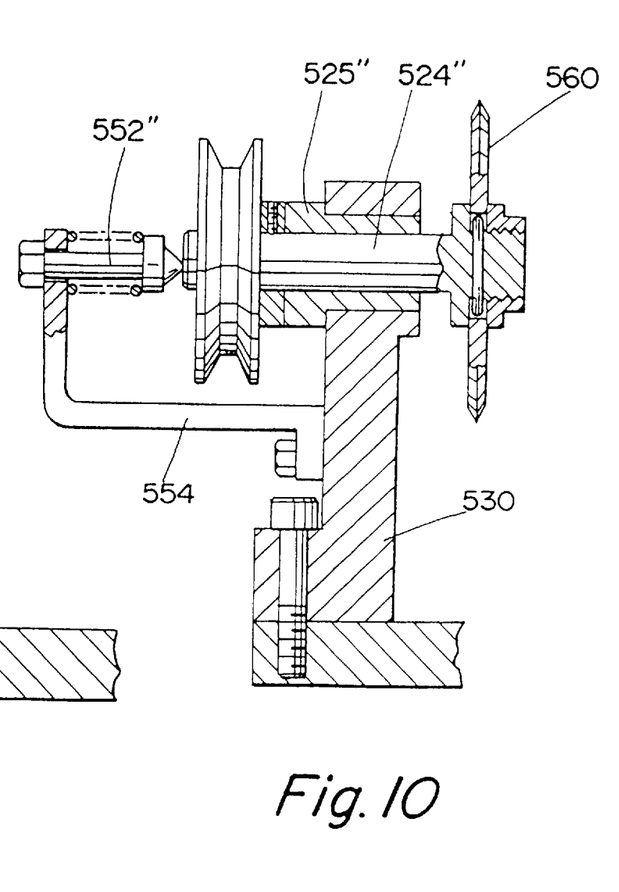
FIG. 10 is a side view, similar to FIG. 9 but with a plate-like cutter.

Referring to FIG. 10, there is illustrated an embodiment of the key duplicating machine 550 wherein a conventional, circular, plate-like cutting blade 560 is substituted for the cup shaped cutting blade of the present invention.

While the cutting blade of the present invention is typically a cup shaped blade, it is within the terms of the invention to substitute any type of cutting blade, such as a circular, plate-like blade.

It is apparent that there has been provided in accordance with this invention a key duplicating machine and the method of operating the machine that satisfy the objects, means and advantages set forth hereinbefore. While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A key duplicating machine comprising:

a chassis;

at least one electrical motor secured to said key duplicating machine;

first and second clamping mechanisms secured to said key duplicating machine, said first clamping mechanism being adjusted to clamp a single sided profile key blank and a single sided profile key to be duplicated and said second clamping mechanism being adjusted to clamp a double sided profile key blank and a double sided profile key to be duplicated;

first, second and third key cutters secured to said chassis and being in communication with said at least one electrical motor; and said first clamping mechanism and said first key cutter being adjustable to increase and decrease a first distance between them for cutting of a single sided profile key blank, and said second clamping mechanism and said second and third key cutters being adjustable to increase and decrease a second distance between them in order to perform the cutting of a double sided profile key blank.

2. A key cutting method for use with a key duplicating machine comprising a first clamping mechanism being adapted to clamp a single sided key blank and a key to be duplicated, a second clamping mechanism being adapted to clamp a double sided key blank and a key to be duplicated and first, second and third key cutters, said key cutting method comprising the steps of:

(a) clamping a key blank and a key to be duplicated in at least one of said first and second clamping mechanism;

(b) decreasing at least one of the distances between said first clamping mechanism and said first key cutter and between said second clamping mechanism and between said second and third key cutters;

(c) duplicating and cutting at least one key blank of said single sided and double sided key blanks;

(d) increasing at least one of said distances between said first clamping mechanism and said first key cutter and between said second clamping mechanism and said second and third key cutters; and (e) releasing the key to be duplicated and the cut up key from at least one of said first and second clamping units.

* * * * *